(12) United States Patent
Yankovitz et al.

(10) Patent No.: US 12,193,367 B2
(45) Date of Patent: Jan. 14, 2025

(54) DRIP IRRIGATION EMITTER HAVING A SILICONE-BASED MEMBRANE CONTAINING FERRIC OXIDE

(71) Applicant: NETAFIM, LTD., Tel Aviv (IL)

(72) Inventors: Tsipora Yankovitz, Kazir (IL); Eliyahu Hay Madar, Elihav (IL)

(73) Assignee: NETAFIM, LTD., Tel Aviv (IL)

( * ) Notice: Subject to any disclaimer, the term of this patent is extended or adjusted under 35 U.S.C. 154(b) by 480 days.

(21) Appl. No.: 17/517,315

(22) Filed: Nov. 2, 2021

(65) Prior Publication Data

US 2022/0132755 A1 May 5, 2022

Related U.S. Application Data

(60) Provisional application No. 63/109,355, filed on Nov. 4, 2020.

(51) Int. Cl.
*A01G 25/02* (2006.01)
*B29C 67/24* (2006.01)
*G05D 16/06* (2006.01)

(52) U.S. Cl.
CPC .......... *A01G 25/023* (2013.01); *B29C 67/246* (2013.01); *G05D 16/0633* (2013.01)

(58) Field of Classification Search
CPC .... A01G 25/02; A01G 25/023; B29C 67/246; G05D 16/0633
USPC ........... 239/145, 542, 602, DIG. 12, DIG. 19
See application file for complete search history.

(56) References Cited

U.S. PATENT DOCUMENTS

| 4,307,841 | A | * | 12/1981 | Mehoudar | ............ | A01G 25/023 |
| | | | | | | 239/542 |
| 5,813,603 | A | * | 9/1998 | Kurtz | ................... | A01G 25/023 |
| | | | | | | 239/542 |
| 6,371,392 | B1 | * | 4/2002 | Steinman | ................ | B05B 1/323 |
| | | | | | | 239/542 |
| 2017/0265402 | A1 | * | 9/2017 | Dermitzakis | ........ | A01G 25/026 |
| 2020/0288653 | A1 | * | 9/2020 | Socolsky | ............ | A01G 25/023 |

FOREIGN PATENT DOCUMENTS

CN 107793767 A * 3/2018 ..... C08K 2003/2213

OTHER PUBLICATIONS

Technical Data Sheet for Elastosil® Color Paste FL Red Iron Oxide RAL 3013, Wacker Chemie AG, available at https://www.wacker.com/h/en-de/silicone-rubber/silicone-rubber-additives/elastosil-color-paste-fl-red-iron-oxide-ral-3013/p/000005228, retrieved Nov. 2, 2021.

* cited by examiner

*Primary Examiner* — Steven J Ganey
(74) *Attorney, Agent, or Firm* — Womble Bond Dickinson (US) LLP

(57) ABSTRACT

A drip irrigation emitter includes a cover member, a base member, and a silicone-based membrane containing ferric oxide, the membrane=e located between the two members. The membrane includes liquid silicone rubber (LSR) material and ferric oxide. The ferric oxide in volumetric percentage ranges from about 0.1% to about 0.5% of the overall volume of the LSR material.

10 Claims, 1 Drawing Sheet

DRIP IRRIGATION EMITTER HAVING A SILICONE-BASED MEMBRANE CONTAINING FERRIC OXIDE

RELATED APPLICATIONS

The present application claims priority to U.S. Provisional Patent Application No. 63/109,355, filed Nov. 4, 2020. The contents of the aforementioned application are incorporated by reference in their entirety.

TECHNICAL FIELD

Embodiments of the invention relate to drip emitter silicone-based membranes, in particular membranes comprising Liquid Silicone Rubber (LSR).

BACKGROUND

Liquid silicone rubber (LSR) has characteristics and chemical properties that make it a suitable material for a variety of applications and industries. Various additives are available for increasing the robustness of LSR, such as the Pigment Paste Masterbatches available from Wacker Chemie AG that have shown effectiveness in increasing resistance of LSRs to hot air.

Use of Liquid Silicone Rubber (LSR) has become common in irrigation drip emitters for example as the material for the membrane that is used for controlling the flow rate of water discharged by the emitter. In control of flow rate, the membrane operates to control liquid flow out of the emitter so that it is substantially independent of pressure at an inlet of the emitter for a range of pressures typically encountered in irrigation applications.

It has however been found that when used for substantially long periods of time in contact with water, LSR membranes tend to undergo changes that may affect their ability to function properly for their intended use.

For example, such membranes may undergo changes that may include: swelling, becoming opaque, blister formation (and the like). Environmental conditions causing such changes in LSR based membranes may vary and may be due e.g. to use of the drip emitters with waste water (or the like). Combination of Chlorine and Acid has also been found in certain cases to promote changes such as opacity, followed in some cases by swelling and blister formation. Low PH has also been found in certain cases to promote membrane degradation.

There is therefore a need to improve resistance of silicone-based membranes also for use in environments where exposure to liquid and water occurs, such as in drip irrigation emitters.

SUMMARY

The following embodiments and aspects thereof are described and illustrated in conjunction with systems, tools and methods which are meant to be exemplary and illustrative, not limiting in scope.

Embodiments of membranes of the present invention are arranged to comprise improved resistance to changes in characteristics that can affect suitability for use in irrigation applications, in particular in drip irrigation emitters.

In an embodiment, a membrane for a drip irrigation emitter can be arranged to include liquid silicone rubber (LSR) material and Ferric oxide, wherein the Ferric oxide is in volumetric percentage ranging from about 0.1% to about 0.5% of the combined overall volume of the LSR and Ferric oxide materials.

In addition to the exemplary aspects and embodiments described above, further aspects and embodiments will become apparent by reference to the figures and by study of the following detailed descriptions.

BRIEF DESCRIPTION OF THE FIGURES

Exemplary embodiments are illustrated in referenced figures. It is intended that the embodiments and figures disclosed herein are to be considered illustrative, rather than restrictive. The invention, however, both as to organization and method of operation, together with objects, features, and advantages thereof, may best be understood by reference to the following detailed description when read with the accompanying figures, in which.

Figures 1A, 1B:
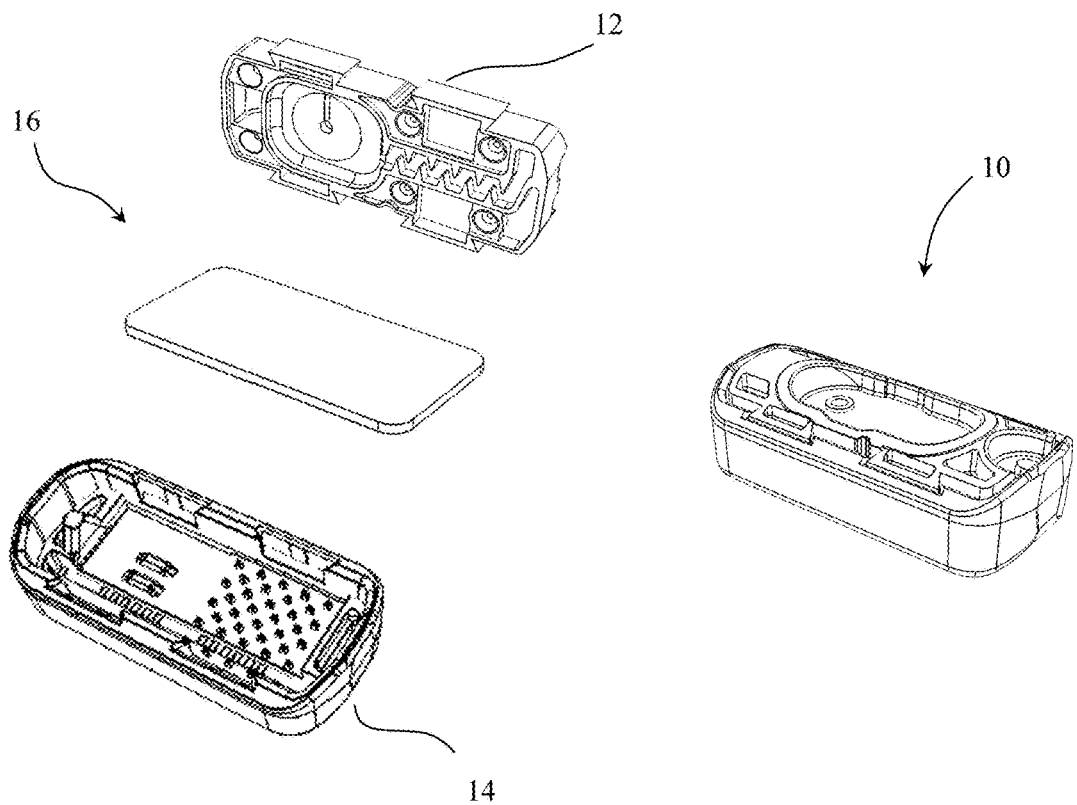
FIGS. 1A and 1B schematically show, respectively, assembled and exploded views of a drip irrigation emitter, revealing (in the exploded view) a membrane located here in-between two members of the drip irrigation emitter in its assembled state.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated within the figures to indicate like elements.

DETAILED DESCRIPTION

Attention is drawn to FIGS. 1A and 1B schematically illustrating a drip irrigation emitter 10. Drip irrigation emitter 10 in this example may be formed from two members 12, 14 and may include a membrane 16 that in the assembled state of the emitter (FIG. 1A) may be located sandwiched in-between the two members.

The two members 12, 14 may include an emitter cover member 12 and an emitter base member 14. The emitter cover member 12 has an outer surface and an inner surface. The outer surface of the emitter cover member 12 is configured to be attached to an inner surface of an irrigation pipe and may comprise an exit pool. Meanwhile, the inner surface of the emitter cover member 12 may comprise a labyrinth-like flow path in fluid communication with a collection pool; an outlet hole connects the collection pool on the inner surface to the exit pool on the outer surface. The emitter base member 14 is configured to face the lumen of an irrigation pipe carrying irrigation liquid, and permit irrigation fluid to enter the drip irrigation emitter 10. Accordingly, the emitter base member 14 is provided with an inlet with a filter configured to prevent particulate matter from entering the assembled drip irrigation emitter 10.

Membrane 16 in this example may be used for controlling liquid flow out of emitter 10 so that it is substantially independent of pressure at an inlet of the emitter for a range of pressures typically encountered in irrigation applications. In the assembled drip irrigation emitter, the membrane 16 covers the collection pool to form a pressure regulating chamber, and also cover the labyrinth-like flow path.

In an embodiment, membrane may be formed from silicone material, for example LSR material—that may be susceptible to changes in its characteristics due to use e.g. for long periods of time in exposure to water, e.g., waste water and/or water with Chlorine and/or Acid and/or Low PH (or the like).

Figure 2:
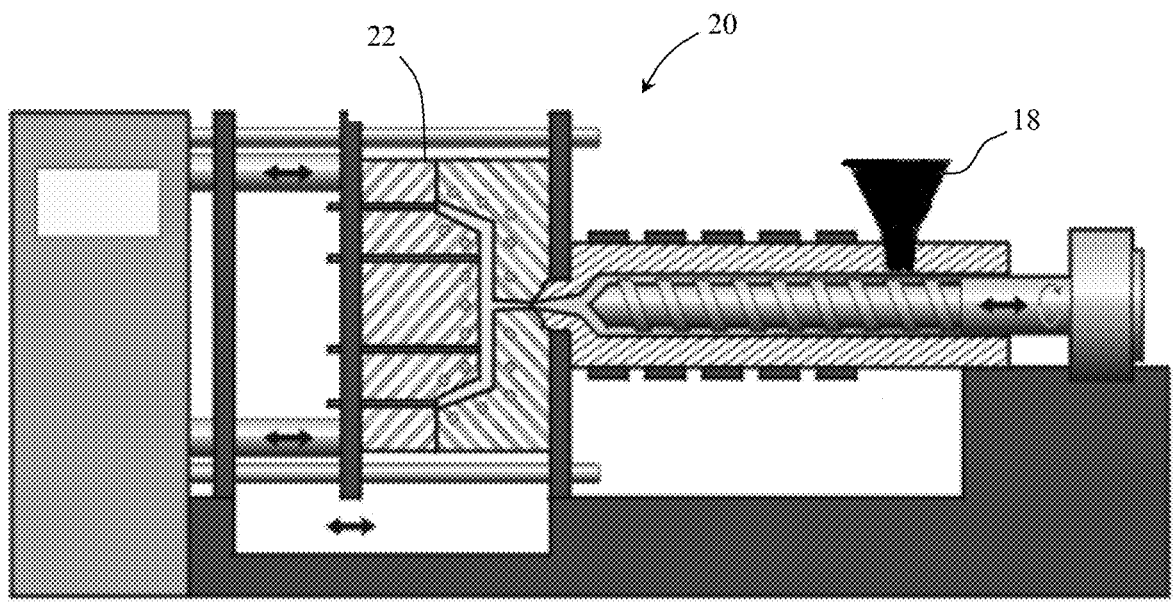
FIG. 2 schematically shows an injection molding process suitable for forming a silicone-based membrane in accordance with various embodiments of the present invention.

Attention is drawn to FIG. 2. Silicone-based membranes suitable for use in drip irrigation emitters are formed in an injection molding process. LSR material is typically fed via a hopper 18 into an injection molding machine 20 that in turn injects molten silicone material into a mold 22 where the final shape is set.

In experiments that were performed, it has been found that by adding ferric oxide to the LSR being fed to the injection molding machine, a silicone-based membrane with improved characteristics for use in irrigation applications can be obtained. Ferric oxide is the inorganic compound with the formula $Fe_2O_3$.

Experiments revealed that a silicone-based membrane with improved resistance for irrigation applications, can be obtained by feeding into an injection molding machine, LSR material that includes Ferric oxide in volumetric percentage ranging from about 0.1% to about 0.5% of the overall volume of the combined used silicone-based material and Ferric oxide, and possible from about 0.15% to about 0.3% of the overall volume of the combined used silicone-based material and Ferric oxide.

In one example, an addition of about 1.5% in volumetric % of the trade named ELASTOSIL® Color Paste FL3013 Red iron oxide of Wacker Chemie AG (https://www.wacker.com/cms/en-de/home/home.html, retrieved Nov. 1, 2021) has been found to increase resistance of the injected silicone-based membranes for irrigation applications.

In the description and claims of the present application, each of the verbs, "comprise" "include" and "have", and conjugates thereof, are used to indicate that the object or objects of the verb are not necessarily a complete listing of members, components, elements or parts of the subject or subjects of the verb.

Furthermore, while the present application or technology has been illustrated and described in detail in the drawings and foregoing description, such illustration and description are to be considered illustrative or exemplary and non-restrictive; the technology is thus not limited to the disclosed embodiments. Variations to the disclosed embodiments can be understood and effected by those skilled in the art and practicing the claimed technology, from a study of the drawings, the technology, and the appended claims.

In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measures cannot be used to advantage.

The present technology is also understood to encompass the exact terms, features, numerical values or ranges etc., if in here such terms, features, numerical values or ranges etc. are referred to in connection with terms such as "about, ca., substantially, generally, at least" etc. In other words, "about 3" shall also comprise "3" or "substantially perpendicular" shall also comprise "perpendicular". Any reference signs in the claims should not be considered as limiting the scope.

Although the present embodiments have been described to a certain degree of particularity, it should be understood that various alterations and modifications could be made without departing from the scope of the invention as hereinafter claimed.

What is claimed is:

1. A drip irrigation emitter comprising:
   an emitter cover member configured to be attached to an inner surface of an irrigation pipe;
   an emitter base member attached to the cover member and configured to face a lumen of the irrigation pipe and permit irrigation liquid to enter the drip irrigation emitter; and
   a membrane positioned between the emitter cover member and the emitter base member, wherein the membrane comprises:
   liquid silicone rubber (LSR) material and ferric oxide, wherein the ferric oxide is in volumetric percentage ranging from about 0.1% to about 0.5% of the combined overall volume of the LSR and ferric oxide materials.

2. The drip irrigation emitter according to claim 1, wherein:
   the ferric oxide is in volumetric percentage ranging from about 0.15% to about 0.3% of the combined overall volume of the LSR and ferric oxide materials.

3. The drip irrigation emitter according to claim 2 wherein:
   the membrane forms a pressure regulating chamber within the irrigation drip emitter, to control liquid flow out of the irrigation drip emitter.

4. The drip irrigation emitter according to claim 1, wherein:
   the membrane forms a pressure regulating chamber within the irrigation drip emitter, to control liquid flow out of the irrigation drip emitter.

5. A drip irrigation emitter membrane comprising liquid silicone rubber (LSR) material and ferric oxide, wherein the ferric oxide is in volumetric percentage ranging from about 0.1% to about 0.5% of the combined overall volume of the LSR and ferric oxide materials.

6. The drip irrigation emitter membrane of claim 5, wherein the ferric oxide is in volumetric percentage ranging from about 0.15% to about 0.3% of the combined overall volume of LSR and ferric oxide materials.

7. A drip irrigation emitter comprising:
   an emitter cover member configured to be attached to an inner surface of an irrigation pipe;
   an emitter base member attached to the cover member and configured to face a lumen of the irrigation pipe and permit irrigation liquid to enter the drip irrigation emitter; and
   an injection molded membrane positioned between the emitter cover member and the emitter base member, wherein the membrane comprises:
   a silicone material and ferric oxide, wherein the ferric oxide is in volumetric percentage ranging from about 0.1% to about 0.5% of the combined overall volume of the silicone and ferric oxide materials.

8. The drip irrigation emitter according to claim 7, wherein:
   the ferric oxide is in volumetric percentage ranging from about 0.15% to about 0.3% of the combined overall volume of the silicone material and ferric oxide materials.

9. The drip irrigation emitter according to claim 8 wherein:
   the membrane forms a pressure regulating chamber within the irrigation drip emitter, to control liquid flow out of the irrigation drip emitter.

10. The drip irrigation emitter according to claim 7, wherein:

the membrane forms a pressure regulating chamber within the irrigation drip emitter, to control liquid flow out of the irrigation drip emitter.

\* \* \* \* \*